US012049761B2

(12) United States Patent
Schuss, Jr. et al.

(10) Patent No.: US 12,049,761 B2
(45) Date of Patent: Jul. 30, 2024

(54) ADAPTER FOR A FASTENER DRIVING TOOL

(71) Applicant: SEE Holdings, LLC, Charlotte, NC (US)

(72) Inventors: August Adolf Johan Schuss, Jr., Cornelius, NC (US); William James Frei, Charlotte, NC (US); Benjamin Jordan Hensley, Gastonia, NC (US); James Bryant Nelson, Tega Cay, SC (US); James Michael Oliver, Waxhaw, NC (US)

(73) Assignee: SEE HOLDINGS, LLC, Charlotte, NC (US)

( * ) Notice: Subject to any disclaimer, the term of this patent is extended or adjusted under 35 U.S.C. 154(b) by 0 days.

(21) Appl. No.: 17/482,922

(22) Filed: Sep. 23, 2021

(65) Prior Publication Data

US 2022/0178147 A1 Jun. 9, 2022

Related U.S. Application Data

(60) Provisional application No. 63/122,347, filed on Dec. 7, 2020.

(51) Int. Cl.

*B25C 7/00* (2006.01)
*B25C 1/00* (2006.01)
*E04D 15/04* (2006.01)

(52) U.S. Cl.

CPC .............. *E04D 15/04* (2013.01); *B25C 1/008* (2013.01); *B25C 7/00* (2013.01); *E04D 2015/045* (2013.01)

(58) Field of Classification Search

CPC .................................. B25C 1/008; B25C 7/00
See application file for complete search history.

(56) References Cited

U.S. PATENT DOCUMENTS

| | | | | |
|---|---|---|---|---|
| 4,211,353 A * | 7/1980 | Aunis | B25C 1/008 | 173/13 |
| 4,380,312 A * | 4/1983 | Landrus | B25C 5/06 | 227/139 |
| 4,821,937 A * | 4/1989 | Rafferty | B25C 1/188 | 227/8 |
| 5,094,380 A * | 3/1992 | Nasiatka | B25C 1/008 | 227/156 |
| 5,918,790 A * | 7/1999 | Donnell | B25C 7/00 | 227/150 |

(Continued)

OTHER PUBLICATIONS

Brent Wells. Wells Design Tool Company. Retrieved from http://wellsdesigntoolco.com/ezi/.

*Primary Examiner* — Thanh K Truong
*Assistant Examiner* — Katie L Gerth
(74) *Attorney, Agent, or Firm* — Moore & Van Allen PLLC; R. W. McCord Rayburn

(57) ABSTRACT

A fastener driving tool and an adapter for a fastener driving tool are described herein for permitting accurate placement of fasteners with respect to an edge of a board (e.g., a top edge of a siding board). The adapter may include an adapter body having a central opening for receiving a head of a fastener driving tool and two or more pins positioned in the adapter body. At least two of the pins are positioned in the adapter body such that, when the central opening receives the head, the pins are equidistant from a center of a barrel through which the fastener driving tool drives fasteners.

20 Claims, 10 Drawing Sheets

(56) References Cited

U.S. PATENT DOCUMENTS

| | | | | |
|---|---|---|---|---|
| 6,769,193 | B1 * | 8/2004 | Meisner | B25C 7/00 33/645 |
| 6,824,036 | B2 * | 11/2004 | Walter | E04F 21/1855 227/154 |
| 7,017,790 | B1 * | 3/2006 | Peng | B25C 1/188 227/139 |
| 7,255,256 | B2 * | 8/2007 | McGee | B25C 1/041 227/119 |
| 7,565,992 | B2 * | 7/2009 | Buetow | B25C 7/00 227/123 |
| 7,712,646 | B2 * | 5/2010 | Gamble | B25C 7/00 227/124 |
| 7,739,807 | B2 * | 6/2010 | Grant | B25C 7/00 33/645 |
| 8,056,785 | B2 * | 11/2011 | Gosis | B25C 7/00 227/19 |
| 10,888,985 | B2 * | 1/2021 | Ryan | B25C 7/00 |
| 11,192,226 | B2 * | 12/2021 | Keister | B25C 5/15 |
| 2008/0290128 | A1 * | 11/2008 | Buetow | B25C 7/00 227/8 |
| 2009/0095789 | A1 * | 4/2009 | Gosis | B25C 7/00 227/141 |
| 2018/0229354 | A1 * | 8/2018 | Reed | B25C 7/00 |
| 2020/0308855 | A1 * | 10/2020 | Dicaire | B25C 3/006 |
| 2020/0406438 | A1 * | 12/2020 | Uchiyama | B25C 1/04 |

* cited by examiner

ADAPTER FOR A FASTENER DRIVING TOOL

CROSS-REFERENCE TO RELATED APPLICATION

The present application claims the benefit of U.S. Provisional Application No. 63/122,347 for an "Adapter for a Fastener Driving Tool," filed Dec. 7, 2020, which is hereby incorporated by reference in its entirety.

FIELD OF THE INVENTION

The present invention embraces an adapter for a fastener driving tool.

BACKGROUND

In the construction industry, siding for installation on a side of a structure may be formed of a variety of materials, such as wood, plastic (e.g., vinyl), metal (e.g., aluminum), fiber cement, and/or the like. Each board of siding may be a long strip of material that is secured to the side of the structure using fasteners. Installers may use fastener driving tools to secure siding boards to the side of the structure.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces an adapter for a fastener driving tool, where the adapter includes an adapter body having a central opening for receiving a head of a fastener driving tool and two or more pins positioned in the adapter body, where at least two pins of the two or more pins are positioned in the adapter body such that, when the central opening receives the head, the at least two pins are equidistant from a center of a barrel through which the fastener driving tool drives fasteners.

In some embodiments, the adapter body may include an upper tab, a first tab on a first side of the upper tab, and a second tab on a second side, opposite the first side, of the upper tab and the two or more pins may include an upper pin positioned in the upper tab, a first pin positioned in the first tab, and a second pin positioned in the second tab.

In some embodiments, the adapter body may include machined aluminum.

In some embodiments, each of the two or more pins may include a ferrule, a stud extending through the ferrule, and a biasing mechanism configured to bias the stud within the ferrule such that a portion of the stud extends out of an end of the ferrule.

In some embodiments, the adapter body may include holes, where each hole, of the holes, is configured to receive a pin of the two or more pins. Additionally, or alternatively, each hole, of the holes, may be configured to position an interior edge of a pin of the two or more pins a target distance from the center of the barrel through which the fastener driving tool drives fasteners.

In some embodiments, the central opening may be configured for receiving differently shaped heads of fastener driving tools.

In some embodiments, the at least two pins of the two or more pins may be positioned in the adapter body such that, when the central opening receives heads of different fastener driving tools, the at least two pins are equidistant from centers of barrels through which the fastener driving tools drive fasteners.

In some embodiments, the adapter may include one or more set screws, where the adapter body includes one or more receiving holes for receiving the one or more set screws, and where the one or more set screws are configured to be advanced through the one or more receiving holes into contact with the head of the fastener driving tool.

In another aspect, the present invention embraces a fastener driving tool including a barrel through which the fastener driving tool drives fasteners, a head, at an end of the barrel, through which the fastener driving tool drives fasteners, and an adapter positioned on the head. In some embodiments, the adapter may include an adapter body having a central opening for receiving the head and two or more pins positioned in the adapter body, where at least two pins of the two or more pins are positioned in the adapter body such that the at least two pins are equidistant from a center of the barrel.

In some embodiments, the central opening of the adapter body may be configured to friction fit onto the head of the fastener driving tool.

In some embodiments, the fastener driving tool may include an attachment mechanism attaching the adapter body to the head of the fastener driving tool.

In some embodiments, the adapter body may have a thickness configured such that the adapter does not interfere with operation of the fastener driving tool.

In some embodiments, the head may be integrated with a safety mechanism configured to permit the fastener driving tool to drive a fastener only when the head and the adapter are pressed against a surface.

In some embodiments, the adapter body may include an upper tab, a first tab on a first side of the upper tab, and a second tab on a second side, opposite the first side, of the upper tab. Additionally, or alternatively, the two or more pins may include an upper pin positioned in the upper tab, a first pin positioned in the first tab, and a second pin positioned in the second tab.

In yet another aspect, the present invention embraces a roofing gun including a barrel through which the roofing gun drives roofing nails, a head, at an end of the barrel, through which the roofing gun drives roofing nails, and an adapter positioned on the head. In some embodiments, the adapter may include an adapter body having a central opening for receiving the head and two or more pins positioned in the adapter body, where at least two pins of the two or more pins are positioned in the adapter body such that the at least two pins are equidistant from a center of the barrel.

In some embodiments, the central opening of the adapter body may be configured to friction fit onto the head, and the adapter body may be attached to the head via one or more welds.

In some embodiments, the adapter body may include an upper tab, a first tab on a first side of the upper tab, and a second tab on a second side, opposite the first side, of the upper tab. Additionally, or alternatively, the two or more pins may include an upper pin positioned in the upper tab, a first pin positioned in the first tab, and a second pin positioned in the second tab. In some embodiments, each of the upper pin, the first pin, and the second pin may include a spring-loaded plunger configured to be biased such that each of the upper pin, the first pin, and the second pin projects outward from the adapter body parallel to a direction in which the roofing gun drives roofing nails.

In some embodiments, the roofing gun includes a safety mechanism configured to permit the roofing gun to drive a roofing nail only when the head and the adapter are pressed against a surface.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
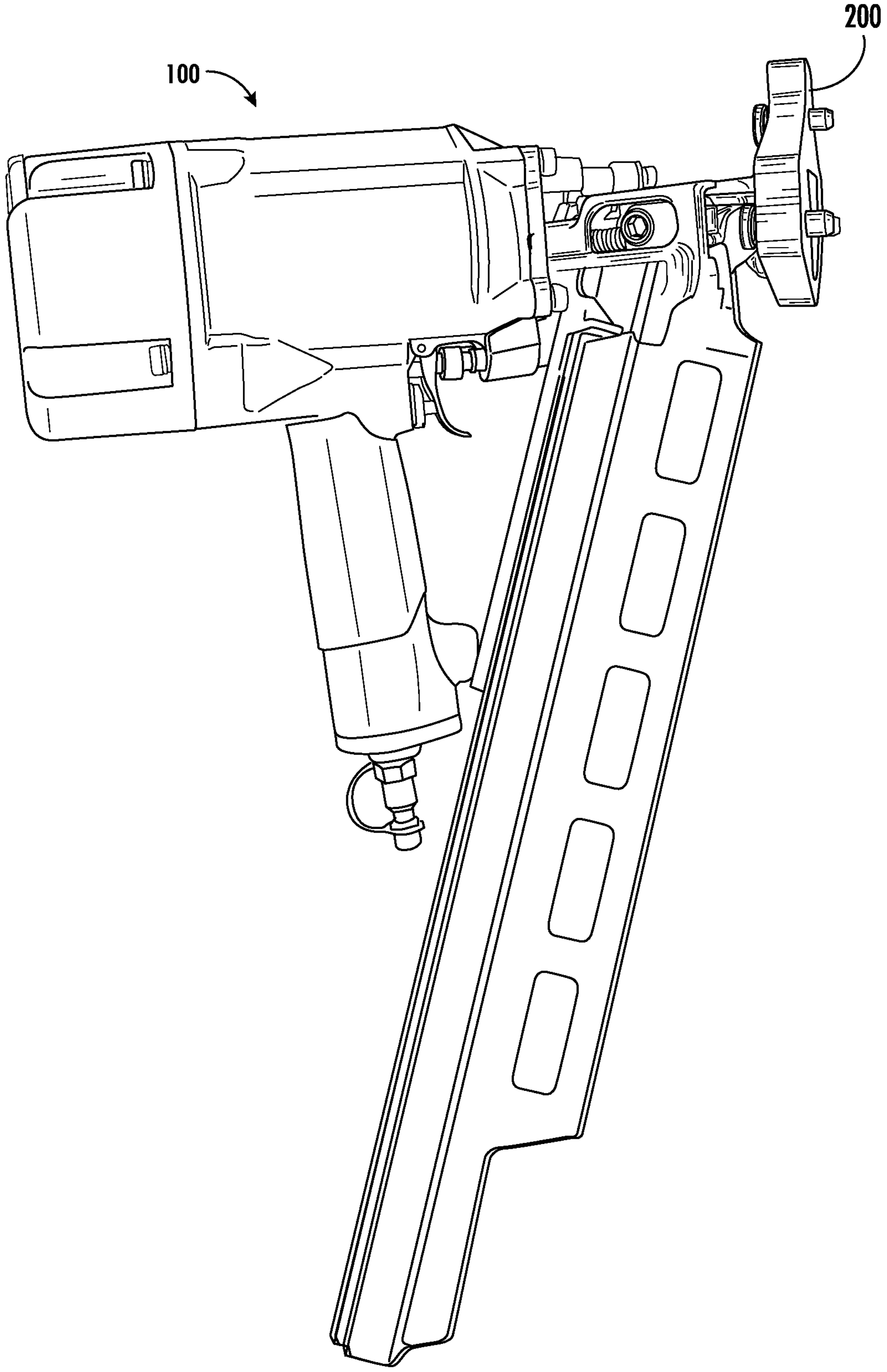
Figure 2:
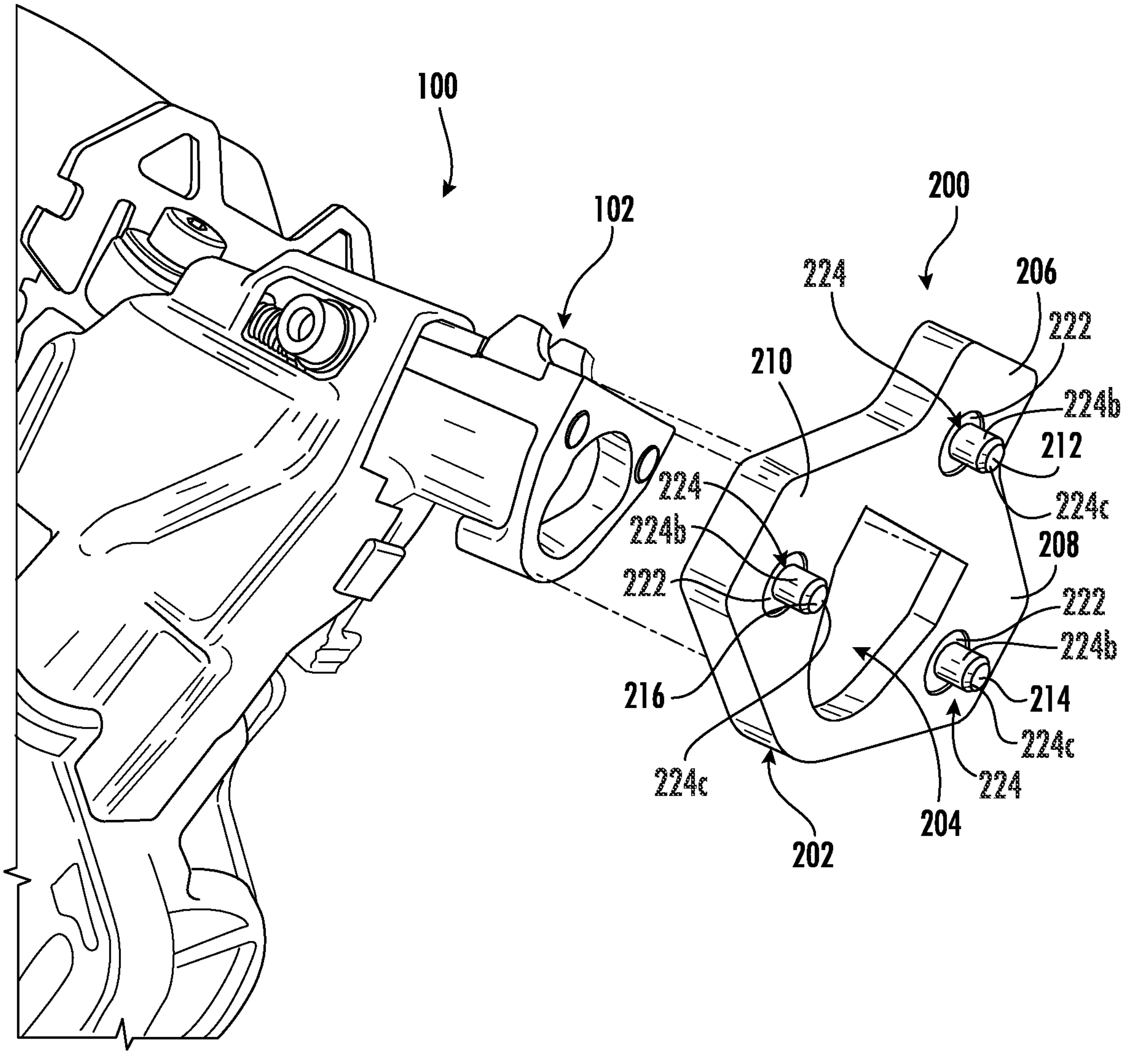
Figure 3:
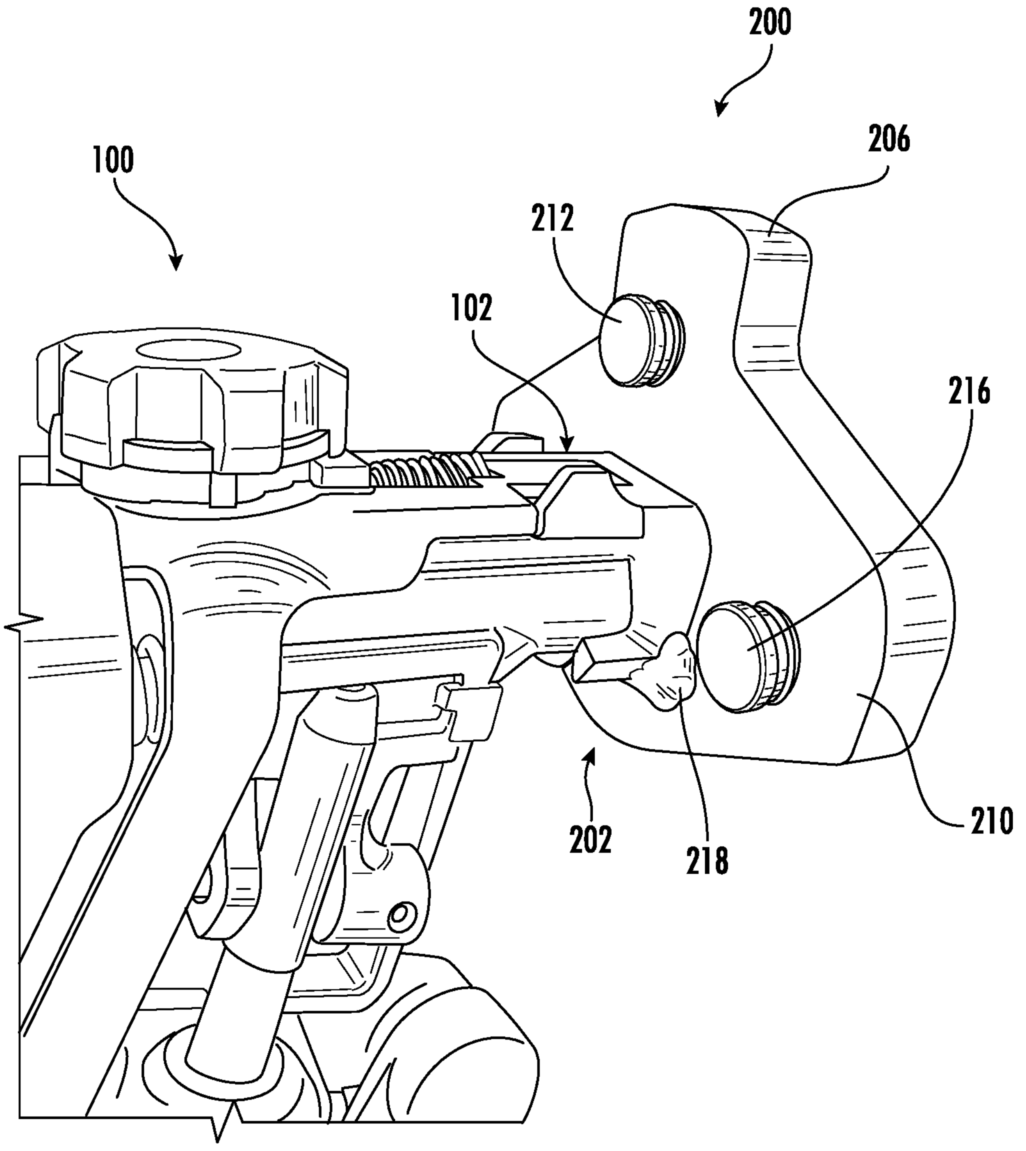
Figure 4:
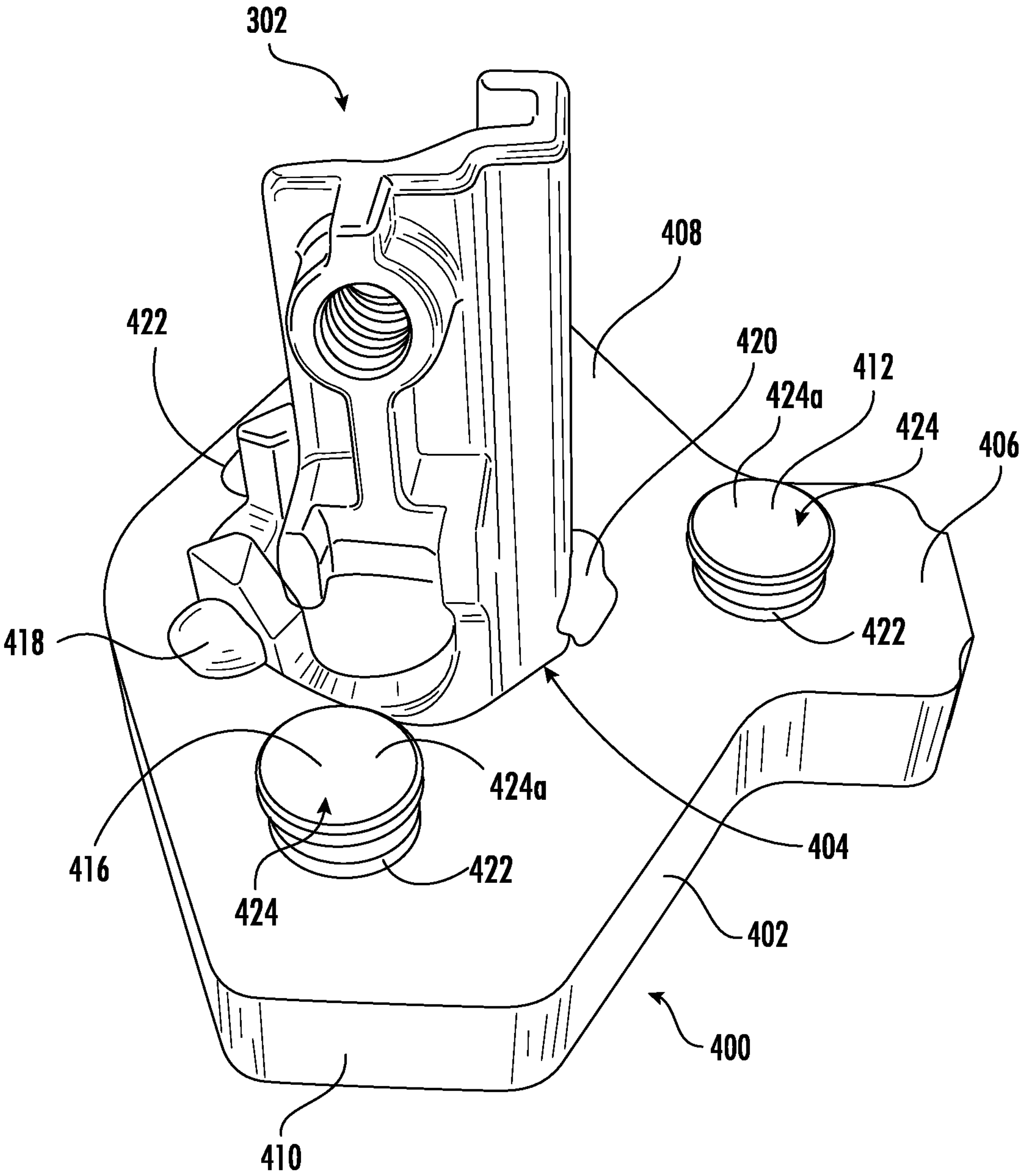
Figure 5:
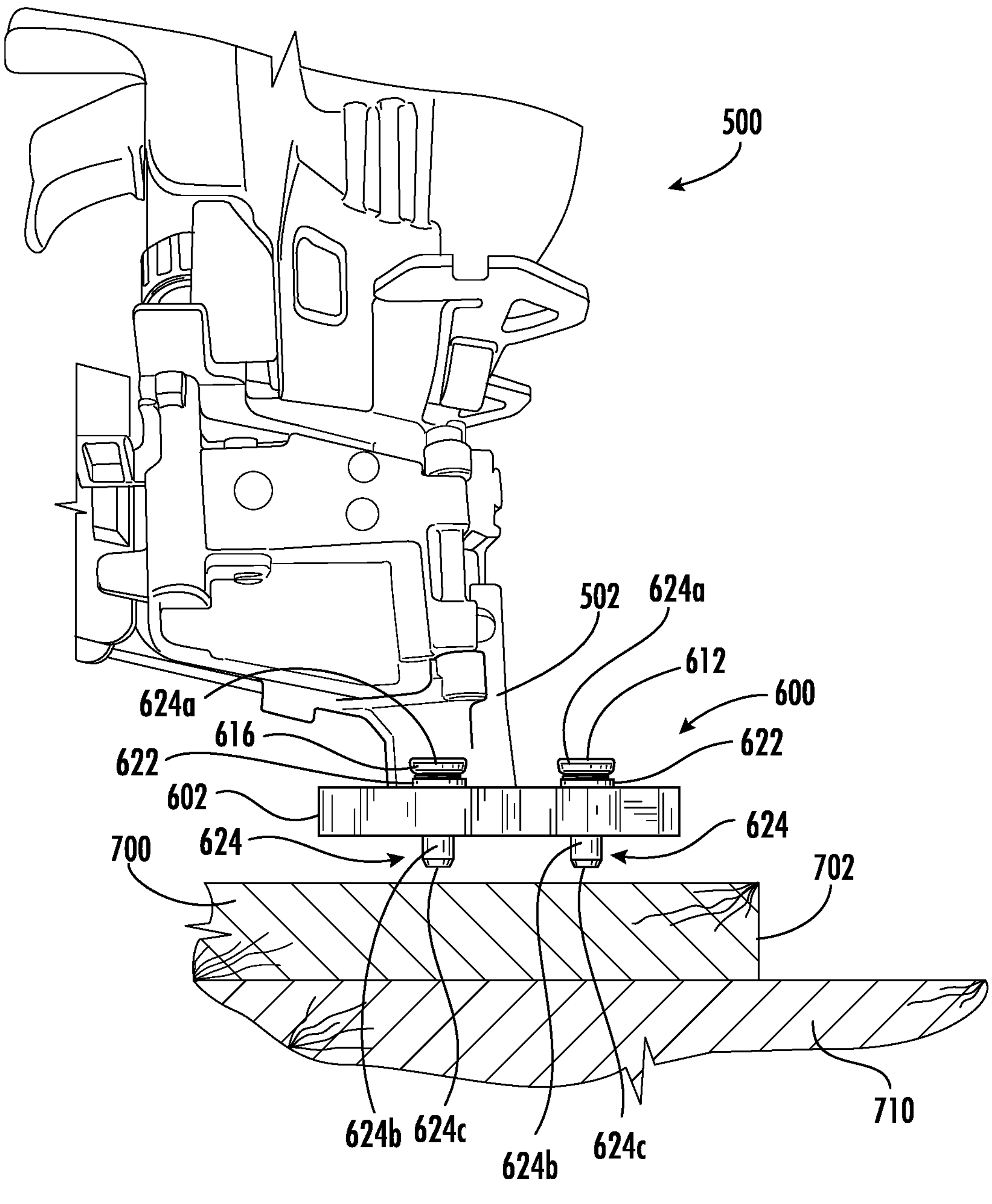
Figure 6:
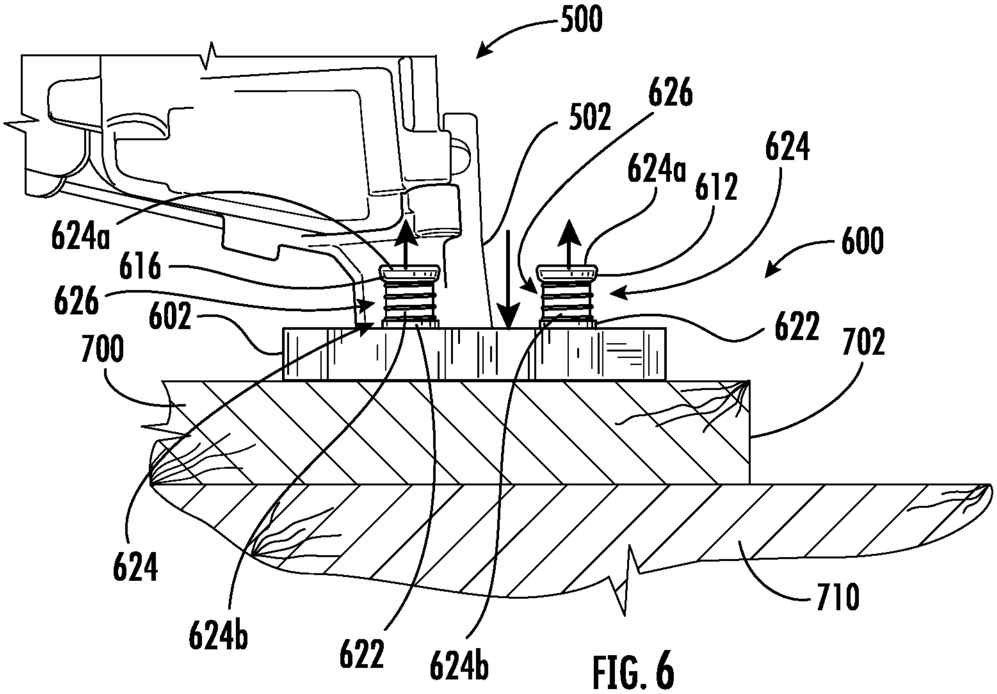
Figure 7:
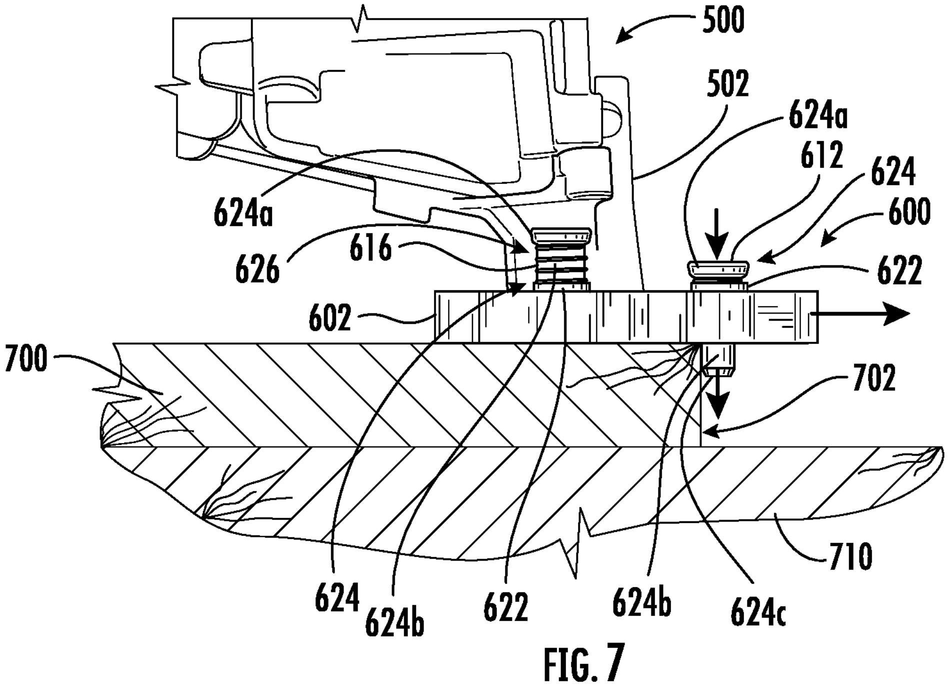
Figure 8:
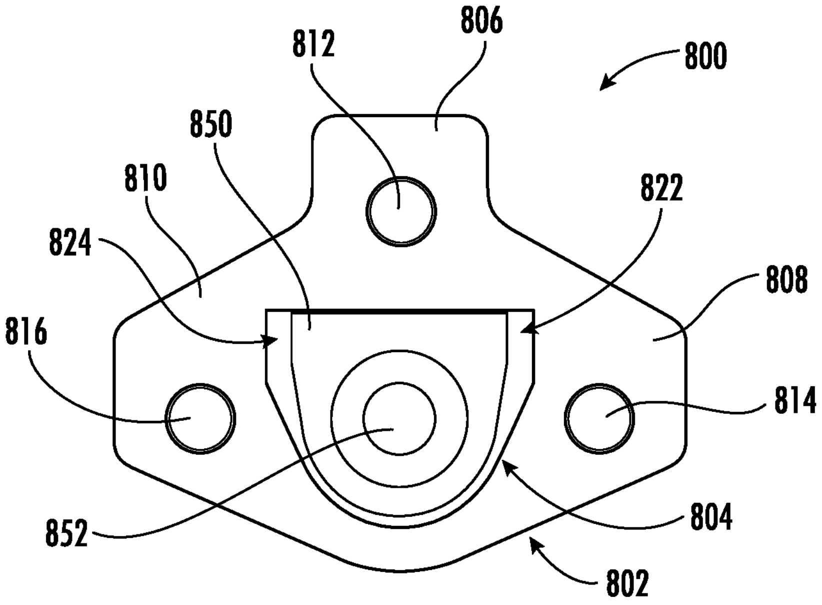
Figure 9:
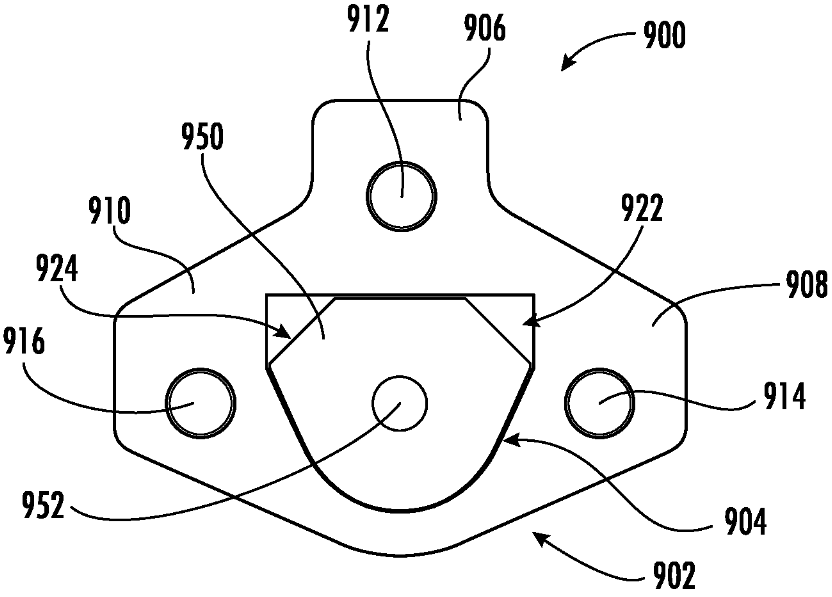
Figure 10:
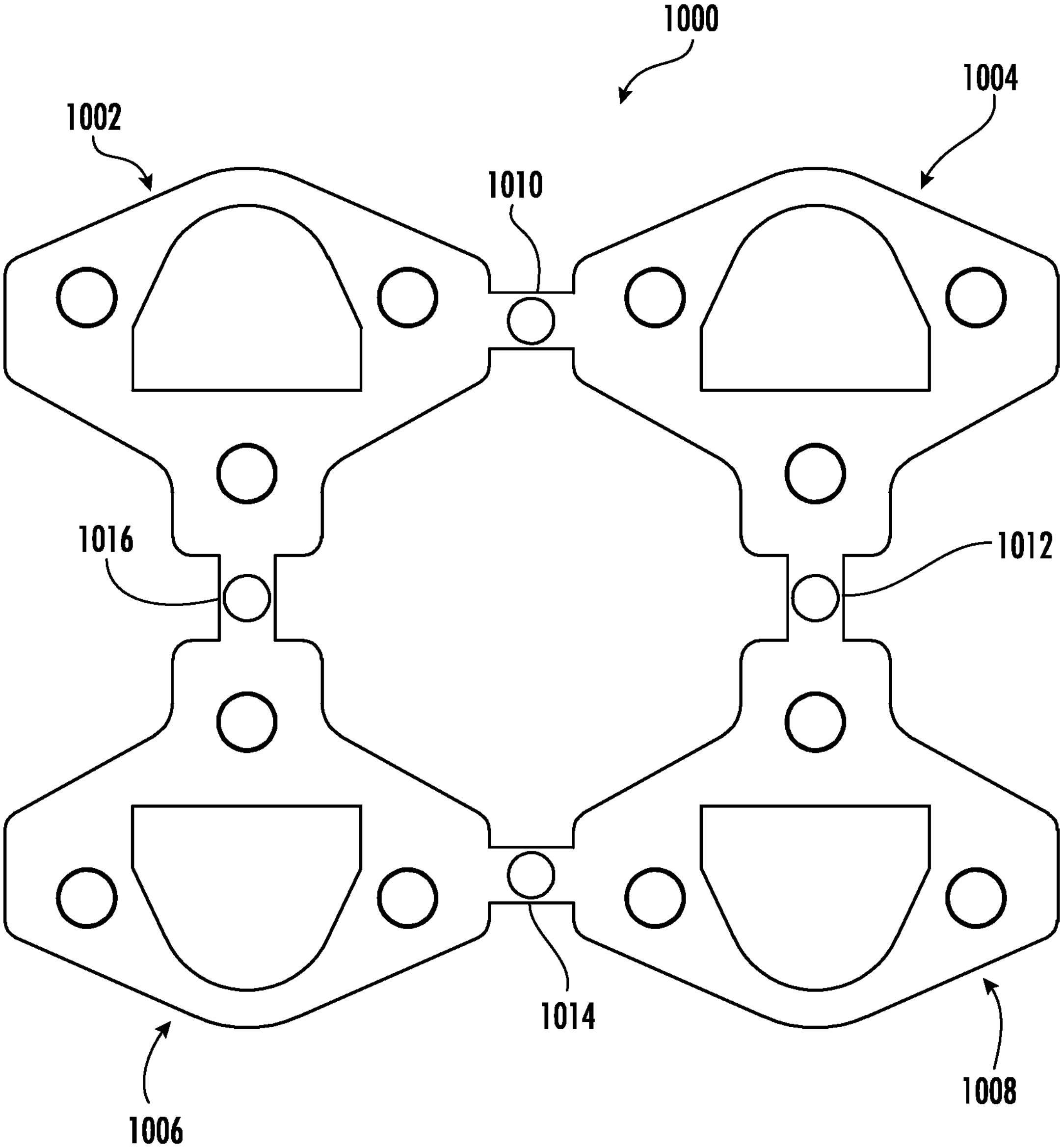
Figure 11:
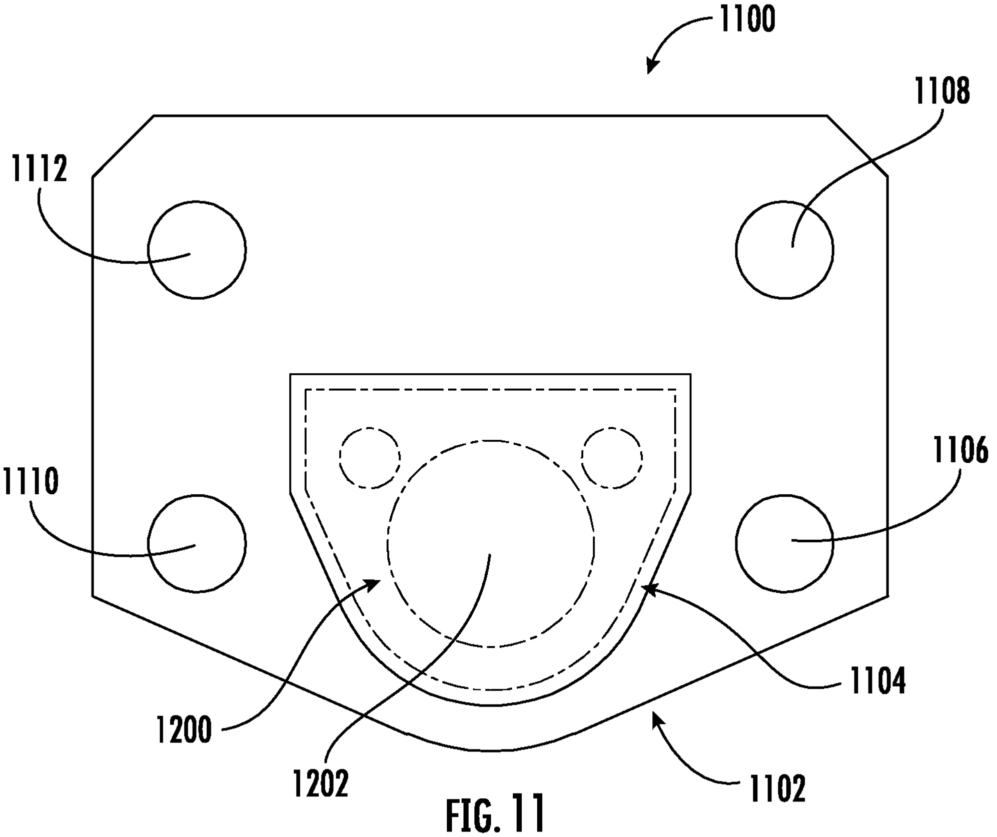
Figure 12:
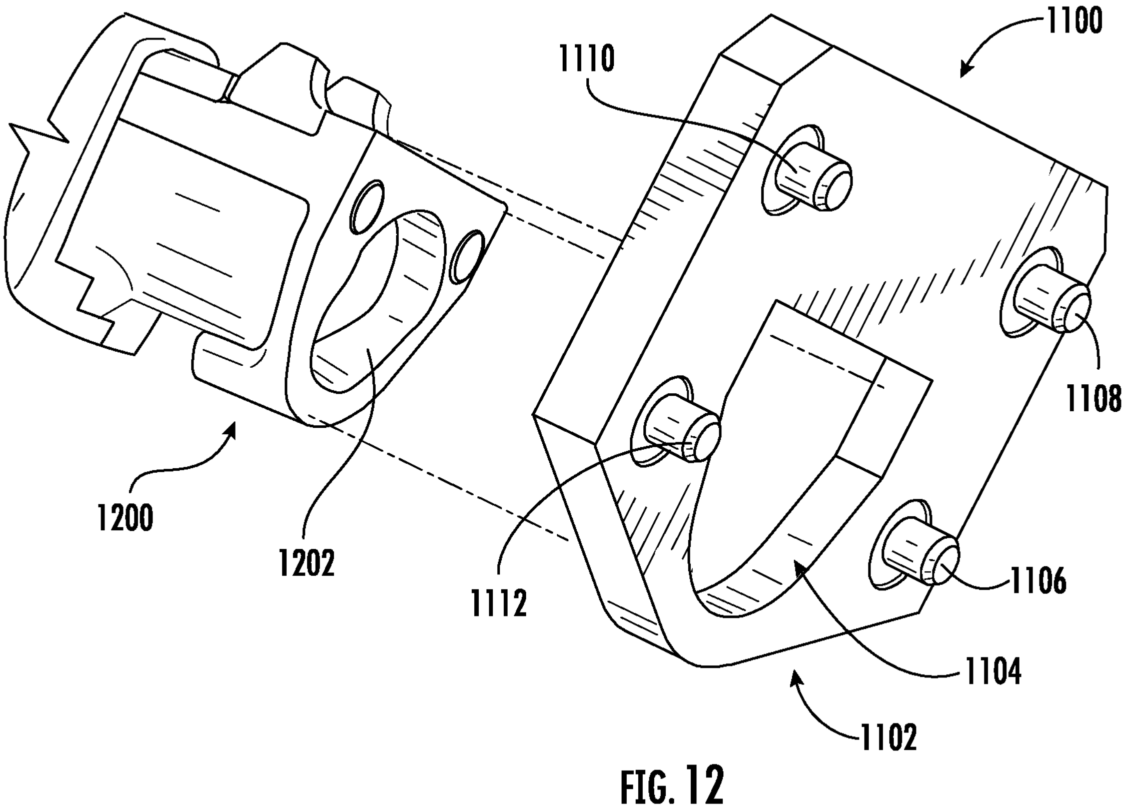
Figure 13:
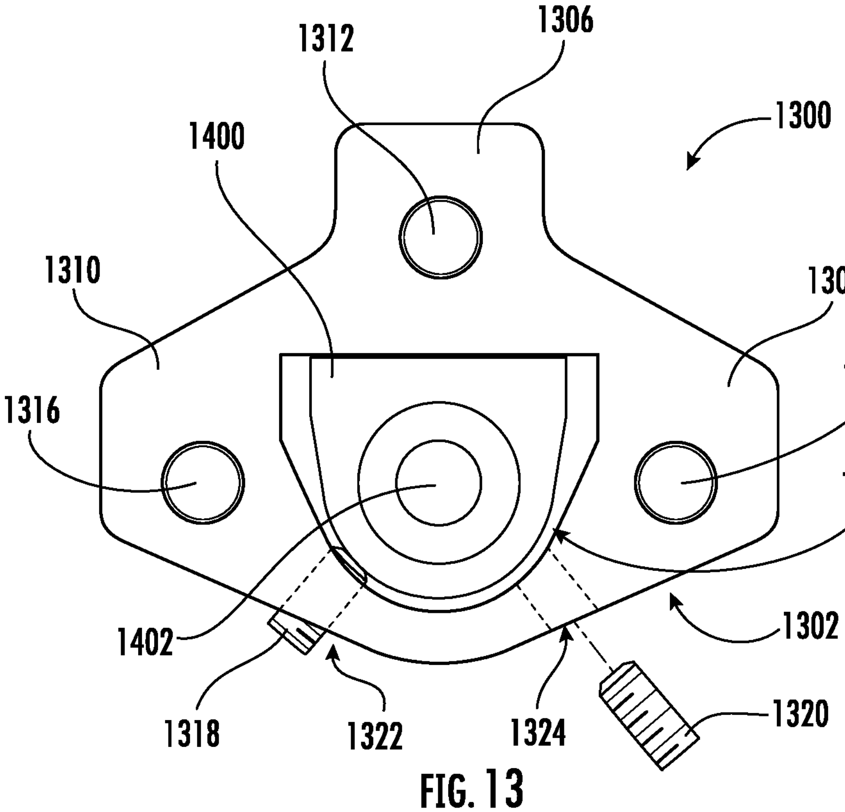
Figure 14:
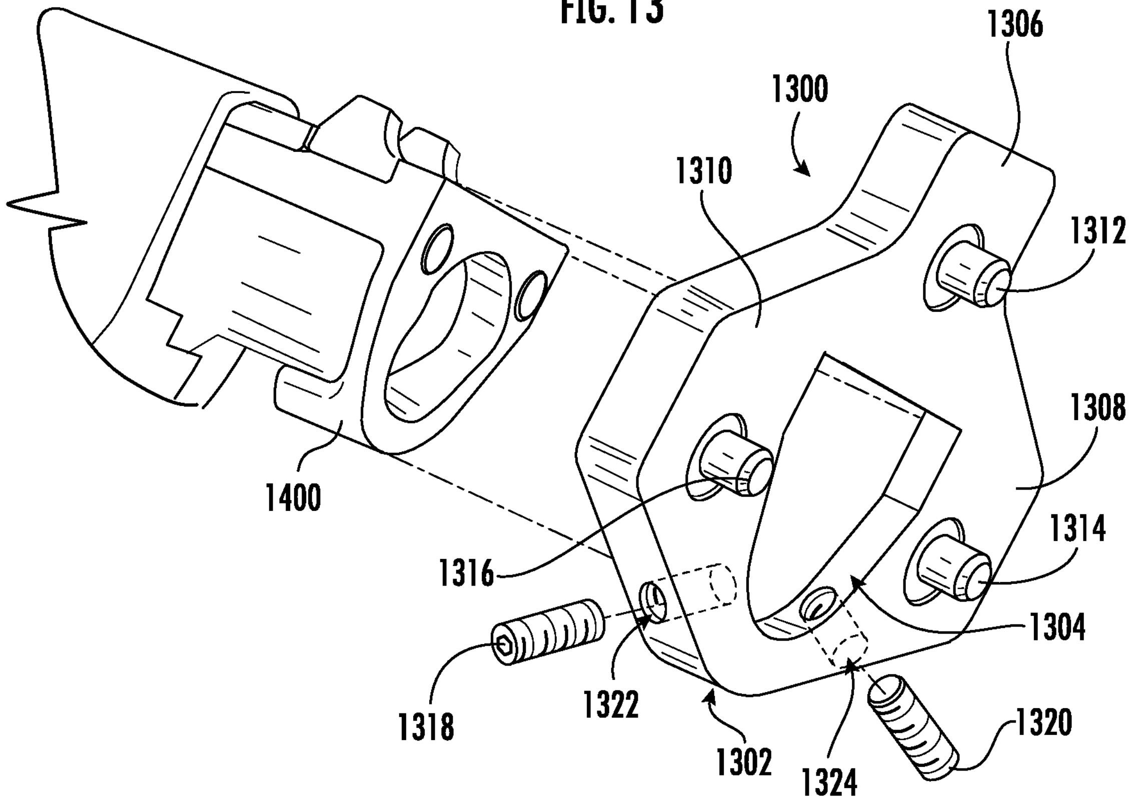

Having thus described embodiments of the invention in general terms, reference will now be made the accompanying drawings, wherein:

FIG. 1 depicts a perspective view of an exemplary fastener driving tool and an exemplary adapter in accordance with an embodiment of the invention;

FIG. 2 depicts a close-up, exploded, front perspective view of a fastener driving tool and an adapter in accordance with an embodiment of the invention;

FIG. 3 depicts a close-up, rear perspective view of a fastener driving tool and an adapter in accordance with an embodiment of the invention;

FIG. 4 depicts a rear perspective view of a head of a fastener driving tool and an adapter in accordance with an embodiment of the invention;

FIG. 5 depicts a side elevation view of a fastener driving tool, an adapter, a siding board, and a structure in accordance with an embodiment of the invention;

FIG. 6 depicts a side elevation view of a fastener driving tool, an adapter, a siding board, and a structure in accordance with an embodiment of the invention;

FIG. 7 depicts a side elevation view of a fastener driving tool, an adapter, a siding board, and a structure in accordance with an embodiment of the invention;

FIG. 8 depicts a front elevation view of a head of a fastener driving tool and an adapter in accordance with an embodiment of the invention;

FIG. 9 depicts a front elevation view of a head of a fastener driving tool and an adapter in accordance with an embodiment of the invention;

FIG. 10 depicts a front elevation view of a manufacturing unit in accordance with an embodiment of the invention;

FIG. 11 depicts a front elevation view of a head of a fastener driving tool and an adapter in accordance with an embodiment of the invention;

FIG. 12 depicts an exploded, front perspective view of a head and an adapter in accordance with an embodiment of the invention;

FIG. 13 depicts a front elevation view of a head of a fastener driving tool and an adapter in accordance with an embodiment of the invention; and FIG. 14 depicts an exploded, front perspective view of a head and an adapter in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, installers may use fastener driving tools, such as siding guns, roofing guns, and/or the like, to secure siding boards to the side of a structure. Roofing guns and roofing nails may provide higher holding power as compared to siding guns (e.g., because roofing nails have larger heads than siding nails). However, placement of the fasteners with respect to a top edge of the board also impacts holding power of the fasteners and the performance of the siding, for example, with respect to wind speed testing. Incorrect placement of the fasteners may result in the installation failing to satisfy manufacturing specifications, building codes, and/or the like.

Some embodiments described herein provide an adapter for a fastener driving tool that permits accurate placement of the fasteners with respect to a top edge of siding boards. The adapter may include an adapter body having a central opening configured for receiving a head of the fastener driving tool and two or more pins positioned in the adapter body, where at least two pins of the two or more pins are positioned in the adapter body such that, when the central opening receives the head, the at least two pins are equidistant from a center of a barrel through which the fastener driving tool drives fasteners. For example, the adapter may include an adapter body including a central opening configured for receiving a head of the fastener driving tool, an upper tab, a left tab, a right tab, and one or more spring-biased pins in each of the upper tab, the left tab, and the right tab.

When driving a fastener into a siding board with the fastener driving tool in an upright position, an installer may rest the one or more pins in the upper tab on a top edge of a siding board being installed, and may press the head of the fastener driving tool against the siding board. When the head of the fastener driving tool is pressed against the siding board, the pins in the left tab and the right tab are pushed by the siding board through the adapter body so that a front surface of the adapter body is flush with the siding board. The adapter may be configured such that resting the one or more pins in the upper tab on the top edge of the siding board positions the head of the fastener driving tool to drive a fastener into the siding board at a target distance (e.g., as determined by a manufacturing specification, a building code, and/or the like) from the top edge of the siding board.

When driving a fastener into a siding board with the fastener driving tool rotated 90 degrees from upright in the clockwise direction (e.g., when an installer is reaching to the right of the installer's body, rotating the fastener driving tool to avoid interference with an object, rotating the fastener driving tool for ergonomic reasons, and/or the like), an installer may rest the one or more pins in the left tab on a top edge of a siding board being installed, and may press the head of the fastener driving tool against the siding board. When the head of the fastener driving tool is pressed against the siding board, the pins in the upper tab and the right tab are pushed by the siding board through the adapter body so that a front surface of the adapter body is flush with the siding board. The adapter may be configured such that resting the one or more pins in the left tab on the top edge of the siding board positions the head of the fastener driving tool to drive a fastener into the siding board at a target distance (e.g., as determined by a manufacturing specification, a building code, and/or the like) from the top edge of the siding board.

Similarly, when driving a fastener into a siding board with the fastener driving tool rotated 90 degrees from upright in the counterclockwise direction (e.g., when an installer is reaching to the left of the installer's body, rotating the fastener driving tool to avoid interference with an object, rotating the fastener driving tool for ergonomic reasons, and/or the like), an installer may rest the one or more pins in the right tab on a top edge of a siding board being installed, and may press the head of the fastener driving tool against the siding board. When the head of the fastener driving tool is pressed against the siding board, the pins in the upper tab and the left tab are pushed by the siding board through the adapter body so that a front surface of the adapter body is flush with the siding board. The adapter may be configured such that resting the one or more pins in the right tab on the top edge of the siding board positions the head of the fastener driving tool to drive a fastener into the siding board at a target distance (e.g., as determined by a manufacturing specification, a building code, and/or the like) from the top edge of the siding board.

FIG. 1 depicts a perspective view of an exemplary fastener driving tool 100 and an exemplary adapter 200 in accordance with an embodiment of the invention. In some embodiments, the fastener driving tool 100 may be a siding gun, a roofing gun, and/or the like. For example, the fastener driving tool 100 may be a roofing gun for driving roofing nails, which, as noted above, provide higher holding power as compared to siding guns. As shown in FIG. 1, the adapter 200 may be positioned on the head of the fastener driving tool 100.

FIG. 2 depicts a close-up, exploded, front perspective view of the fastener driving tool 100 and the adapter 200 in accordance with an embodiment of the invention. As shown in FIG. 2, the fastener driving tool 100 may include a head 102 (e.g., a nose, a plunger, a foot, a foot assembly, and/or the like) upon which the adapter 200 is positioned. As also shown in FIG. 2, the adapter 200 may include an adapter body 202 including a central opening 204 for receiving the head 102 of the fastener driving tool 100. As shown by the dashed lines in FIG. 2, the adapter 200 may be positioned on the head 102 of the fastener driving tool 100 by inserting the head 102 into the central opening 204 of the adapter body 202. In some embodiments, the central opening 204 may be configured to be friction fit onto the head 102. Additionally, or alternatively, the head 102 may be positioned within the central opening 204 and attached to the adapter body 202 using another attachment mechanism, such as welding, set screws, epoxy, and/or the like as described herein (e.g., with respect to FIGS. 3, 4, 13, and/or 14).

As shown in FIG. 2, the adapter 200 and/or the adapter body 202 may include an upper tab 206, a first tab 208 (e.g., a left tab when viewed from the perspective of an installer holding the fastener driving tool 100), and a second tab 210 (e.g., a right tab when view from the perspective of an installer holding the fastener driving tool 100). As also shown in FIG. 2, the adapter 200 may include an upper pin 212 positioned in the upper tab 206, a first pin 214 positioned in the first tab 208, and a second pin 216 positioned in the second tab 210.

In some embodiments, the adapter 200 and/or the adapter body 202 may be aluminum, steel, and/or a synthetic material (e.g., rubber, rubberized plastic, plastic, and/or the like). For example, the adapter 200 and/or the adapter body 202 may be formed by machining (e.g., computer numerical control (CNC) machining and/or the like) a sheet of aluminum. In some embodiments, the adapter body 202 may have a thickness configured such that the adapter 200 and/or the adapter body 202 does not interfere with the operation of the fastener driving tool 100. Additionally, or alternatively, the adapter 200 and/or the adapter body 202 may have a thickness configured such that the adapter 200 and/or the adapter body 202 securely holds the pins (e.g., the upper pin 212, the first pin 214, and the second pin 216) and the head 102 of the fastener driving tool 100 during operation. In some embodiments, the adapter body 202 is 5⁄16-inch thick.

In some embodiments, the pins (e.g., the upper pin 212, the first pin 214, and the second pin 216) may be retractable pins, spring loaded plungers, and/or the like. For example, each pin may include a ferrule 222 and a stud 224 including an upper knob **224*a* (not visible in FIG. 2), a stud body 224*b*, and an endcap 224*c* positioned within and/or extending through the ferrule 222, where the stud 224 is biased downward by a mechanism (e.g., a spring) within the ferrule 222 such that the endcap 224*c* extends out of a lower end of the ferrule 222 and the upper knob 224*a* rests on an upper end of the ferrule 222 and has a greater diameter than the ferrule 222. In some embodiments, the stud 224 and/or the endcap 224*c* may be hardened steel (e.g., with a zinc plate and sealer), the ferrule 222 may be aluminum, and the spring may be stainless steel. In some embodiments, the stud 224 may have a diameter of about 0.451 inches, the endcap 224*c* may have a diameter of about 0.249 inches, the ferrule 222 may have a diameter of about 0.370 inches, and the stud 224** may have a length of about 0.85 inches.

In some embodiments, the adapter body 202 may include holes configured for receiving the pins. For example, and as shown in FIG. 2, each of the upper tab 206, the first tab 208, and the second tab 210 may include a hole configured for receiving a pin. In some embodiments, the pins may be held in the adapter body 202 by a friction fit. Additionally, or alternatively, the pins may be held in the adapter body 202 by another attachment mechanism, such as epoxy, holding pins, set screws, and/or the like.

In some embodiments, the holes in the adapter body 202 are configured to position an interior edge (e.g., an edge oriented closest to the head 102) of each of the pins a target distance from an opening in the head 102 through which a fastener is driven. In some embodiments, each hole may be configured such that resting the pin positioned in the hole on a top edge of a siding board positions the opening in the head 102 to drive a fastener into the siding board at a target distance from the top edge of the siding board. For example, the target distance may correspond to a distance determined by a manufacturing specification, a building code, and/or the like. In some embodiments, the holes in the adapter body 202 may be configured such that resting one of the pins on a top edge of a siding board positions the opening in the head 102 to drive a fastener into the siding board at a distance of one inch from the top edge of the siding board.

In some embodiments, a distance from a center of the opening in the head 102 through which a fastener is driven to each center of the holes in the first tab 208 and the second tab 210 may be about 1.080 inches. Additionally, or alternatively, a distance from the center of the opening in the head 102 through which a fastener is driven to a center of a hole in the upper tab 206 may be about 1.185 inches.

In some embodiments, a distance from a center of the opening in the head 102 through which a fastener is driven to each center of the holes in the first tab 208 and the second tab 210 may be about 1.0175 inches. Additionally, or alternatively, a distance from the center of the opening in the head 102 through which a fastener is driven to a center of a hole in the upper tab 206 may be about 1.06 inches.

In some embodiments, a distance from a center of the opening in the head 102 through which a fastener is driven to each center of the holes in the first tab 208 and the second tab 210 may be about 1.020 inches. Additionally, or alternatively, a distance from the center of the opening in the head 102 through which a fastener is driven to a center of a hole in the upper tab 206 may be about 1.050 inches.

In some embodiments, a diameter of the holes may be about 0.395 inches. Additionally, or alternatively, a distance from a center of the opening in the head 102 through which a fastener is driven to each center of the holes in the first tab 208 and the second tab 210 may be about 1.076 inches. In some embodiments, a distance from the center of the opening in the head 102 through which a fastener is driven to a center of a hole in the upper tab 206 may be about 1.181 inches.

In some embodiments, a distance from a center of the opening in the head 102 through which a fastener is driven to each center of the holes in the first tab 208 and the second tab 210 may be about 0.915 inches. Additionally, or alternatively, a distance from the center of the opening in the head 102 through which a fastener is driven to a center of a hole in the upper tab 206 may be about 0.990 inches.

In some embodiments, a distance from an upper edge of the upper tab 206 to a lowermost edge of the adapter body 202 (e.g., a height of the adapter body 202) may be about 2.595 inches. Additionally, or alternatively, a distance from an outer edge of the first tab 208 to an outer edge of the second tab 210 (e.g., a width of the adapter body 202) may be about 3.255 inches. In some embodiments, a width of the upper tab 206 (e.g., a distance from a left edge of the upper tab 206 to a right edge of the upper tab 206) may be about 1.005 inches.

In some embodiments, portions of an upper edge of the adapter body 202 on each side of the upper tab 206 may angle downwardly from the upper tab 206 toward each of the first tab 208 and the second tab 210 (e.g., as shown in FIG. 2). For example, the center of the opening in the head 102 and the center of the hole in the upper tab 206 may define a vertical axis with respect to the adapter body 202, and the portions of the upper edge of the adapter body 202 on each side of the upper tab 206 may be offset from the vertical axis by an angle of about 119.05 degrees (e.g., in a clockwise direction toward the first tab 208 and in a counterclockwise direction toward the second tab 210). As another example, the center of the opening in the head 102 and the center of the holes in the first tab 208 and the second tab 210 may define a horizontal axis with respect to the adapter body 202, and the portions of the upper edge of the adapter body 202 on each side of the upper tab 206 may be offset from the horizontal axis by an angle of about 29.05 degrees (e.g., in a clockwise direction toward the first tab 208 and in a counterclockwise direction toward the second tab 210).

In some embodiments, portions of a lower edge of the adapter body 202 may angle downwardly from each of the first tab 208 and the second tab 210 toward a lowermost portion of the adapter body 202 or near a center of the lower edge of the adapter body 202. For example, the portion of the lower edge of the adapter body 202 from the second tab 210 to the lowermost portion of the adapter body 202 may define an axis, and the portion of the adapter body 202 from the first tab 208 to the lowermost portion of the adapter body 202 may be offset from the axis by an angle of about 47.53 degrees (e.g., in a counterclockwise direction). Additionally, or alternatively, the center of the opening in the head 102 and the center of the holes in the first tab 208 and the second tab 210 may define a horizontal axis with respect to the adapter body 202, and the portion of the lower edge of the adapter body 202 from the second tab 210 to the lowermost portion of the adapter body 202 and the portion of the adapter body 202 from the first tab 208 to the lowermost portion of the adapter body 202 may be offset from the horizontal axis by similar angles but in opposite directions (e.g., clockwise and counterclockwise).

FIG. 3 depicts a close-up, rear perspective view of the fastener driving tool 100 and the adapter 200 in accordance with an embodiment of the invention. As shown in FIG. 3, the head 102 may be positioned within the central opening 204 (shown in FIG. 2) and attached to the adapter body 202 using an attachment mechanism 218, such as a weld. For example, the head 102 may be attached to the adapter body 202 using multiple welds (e.g., two welds, three welds, four welds, and/or the like). As also shown in FIG. 3, the adapter body 202 may have a thickness configured such that the adapter 200 and/or the adapter body 202 does not interfere with the operation of the fastener driving tool 100.

FIG. 4 depicts a rear perspective view of a head 302 of a fastener driving tool and an adapter 400 in accordance with an embodiment of the invention. In some embodiments, the adapter 400 may be similar to and/or have characteristics of the adapter 200 of FIGS. 1-3. Additionally, or alternatively, the adapter 200 of FIGS. 1-3 may be similar to and/or have characteristics of the adapter 400. As shown in FIG. 4, the adapter 400 may include an adapter body 402 including a central opening 404 for receiving the head 302. As also shown in FIG. 4, the adapter 400 and/or the adapter body 402 may include an upper tab 406, a first tab 408 (e.g., a left tab when viewed from the perspective of an installer holding the fastener driving tool), and a second tab 410 (e.g., a right tab when view from the perspective of an installer holding the fastener driving tool). As also shown in FIG. 4, the adapter 400 may include an upper pin 412 positioned in the upper tab 406 and a second pin 416 positioned in the second tab 410. The adapter 400 may also include a first pin positioned in the first tab 408, which is not shown in FIG. 4 due to being blocked from view by the head 302. As shown in FIG. 4, the pins (e.g., the upper pin 412, the first pin, and the second pin 416) may each include a ferrule 422 and a stud 424 including an upper knob **424*a*, where the upper knob 424*a* rests on an upper end of the ferrule 422 and has a greater diameter than the ferrule 422**.

As shown in FIG. 4, the central opening 404 of the adapter body 402 may be configured to receive the head 302, and the adapter 400 may include one or more attachment mechanisms, such as welds 418, 420, and 422, to secure the adapter 400 to the head 302. In some embodiments, the central opening 404 of the adapter body 402 may be configured to friction fit onto the head 302, and the welds 418, 420, and 422 may be positioned around the head 302 (e.g., to increase durability, rigidity, and/or the like of the connection between the head 302 and the adapter 400). During operation, the head 302 and the adapter 400 may be spring-biased away from the fastener driving tool and/or integrate with a safety mechanism of the fastener driving tool, such that the fastener driving tool will only drive a fastener when the head 302 and the adapter 400 are pressed against a surface (e.g., a siding board and/or the like), thereby pushing the head 302 and the adapter 400 toward the fastener driving tool.

FIGS. 5-7 depict a side elevation view of a fastener driving tool 500, an adapter 600, a siding board 700, and a structure 710 in accordance with an embodiment of the invention. In some embodiments, the adapter 600 may be similar to and/or have characteristics of the adapter 200 of FIGS. 1-3 and/or the adapter 400 of FIG. 4. Additionally, or alternatively, the adapter 200 of FIGS. 1-3 and/or the adapter 400 of FIG. 4 may be similar to and/or have characteristics of the adapter 600. For example, and as shown in FIGS. 5-7, the adapter 600 may include an adapter body 602 including a central opening for receiving a head 502 of the fastener driving tool 500. Furthermore, the adapter 600 may include an upper pin 612 positioned in an upper tab of the adapter body 602 and a second pin 616 positioned in a second tab of the adapter body 602. The adapter 600 may also include a first pin positioned in a first tab of the adapter body 602, which is not shown in FIGS. 5-7 due to being blocked from view by the head 502 and the second pin 616.

As shown in FIG. 5, each pin may be a spring-loaded plunger configured to be biased downward such that the pin projects downward from the adapter 600 and/or the adapter body 602, and each pin may include a ferrule 622 and a stud 624 including an upper knob 624*a*, a stud body 624*b*, and an endcap 624*c* positioned within and/or extending through the ferrule 622, where the stud 624 is biased downward by a biasing mechanism 626 (see FIGS. 6 and 7) within the ferrule 622 such that the endcap 624*c* extends out of a lower end of the ferrule 622 and the upper knob 624*a* rests on an upper end of the ferrule 622 and has a greater diameter than the ferrule 622. As also shown in FIG. 5, the siding board 700 may include an upper edge 702 and may be positioned by an installer on the structure 710.

As shown by the central arrow in FIG. 6, the installer may press the head 502 of the fastener driving tool 500 and the adapter 600 against an outward-facing surface of the siding board 700. As the pins 612 and 616 contact the outward-facing surface of the siding board 700, the pins 612 and 616 are pushed upward through the adapter 600 and/or the adapter body 602 as shown by the left and right arrows in FIG. 6. As also shown in FIG. 6, a front surface of the adapter 600 and/or the adapter body 602 may be flush with the outward-facing surface of the siding board 700.

As shown by the right arrow in FIG. 7, the installer may slide the head 502 and the adapter 600 towards the upper edge 702 of the siding board 700, and, as shown by the two downward arrows, the upper pin 612 may project downward from the adapter 600 and/or the adapter body 602 and engage the upper edge 702 of the siding board 700. When the upper pin 612 engages the upper edge 702 of the siding board 700, the installer may operate the fastener driving tool 500 to drive a fastener through the siding board 700 and into the structure 710, thereby securing the siding board 700 to the structure. By driving the fastener through the siding board 700 when the upper pin 612 is engaged with the upper edge 702, the fastener may be positioned at a target distance (e.g., as determined by a manufacturing specification, a building code, and/or the like) from the upper edge 702 of the siding board 700.

In some embodiments, the installer may rotate the fastener driving tool 500 ninety degrees counterclockwise from the orientation shown in FIGS. 5-7. In such embodiments, rather than the upper pin 612 projecting downward, the second pin 616 may project downward from the adapter 600 and/or the adapter body 602 and engage the upper edge 702 of the siding board 700 as the installer slides the head 502 and the adapter 600 towards the upper edge 702. Similarly, the installer may rotate the fastener driving tool 500 ninety degrees clockwise from the orientation shown in FIGS. 5-7, and the first pin may project downward from the adapter 600 and/or the adapter body 602 and engage the upper edge 702 of the siding board 700 as the installer slides the head 502 and the adapter 600 towards the upper edge 702. Thus, the adapter may position the head 502 to drive a fastener into the siding board 700 at the target distance from the upper edge 702 when the fastener driving tool 500 is in an upright position, rotated ninety degrees clockwise, or rotated ninety degrees counterclockwise.

FIG. 8 depicts a front elevation view of a head 850 of a fastener driving tool and an adapter 800 in accordance with an embodiment of the invention. In some embodiments, the adapter 800 may be similar to and/or have characteristics of the adapter 200 of FIGS. 1-3, the adapter 400 of FIG. 4, and/or the adapter 600 of FIGS. 5-7. Additionally, or alternatively, the adapter 200 of FIGS. 1-3, the adapter 400 of FIG. 4, and/or the adapter 600 of FIGS. 5-7 may be similar to and/or have characteristics of the adapter 800. For example, and as shown in FIG. 8, the adapter 800 may include an adapter body 802 including a central opening 804 for receiving the head 850 of the fastener driving tool. As also shown in FIG. 8, the adapter 800 and/or the adapter body 802 may include an upper tab 806, a first tab 808 (e.g., a left tab when viewed from the perspective of an installer holding the fastener driving tool), and a second tab 810 (e.g., a right tab when view from the perspective of an installer holding the fastener driving tool). As also shown in FIG. 8, the adapter 800 may include an upper pin 812 positioned in the upper tab 806, a first pin 814 positioned in the first tab 808, and a second pin 816 positioned in the second tab 810.

As shown in FIG. 8, each of the pins (e.g., the upper pin 812, the first pin 814, and the second pin 816) is equidistant from a barrel 852 in the head 850 through which a fastener is driven by the fastener driving tool. Furthermore, each of the pins is positioned in the adapter body 802 such that, when a pin engages an upper edge of a siding board, the barrel 852 is positioned at a target distance (e.g., as determined by a manufacturing specification, a building code, and/or the like) from the upper edge of the siding board.

As also shown in FIG. 8, the central opening 804 may be configured to receive the head 850 such that gaps 822 and 824 are formed between the edge of the central opening 804 and the head 850. In some embodiments, the gaps 822 and 824 may be configured to simplify and/or increase efficiency of manufacturing the adapter 800 while still securely receiving and/or attaching to the head 850.

FIG. 9 depicts a front elevation view of a head 950 of a fastener driving tool and an adapter 900 in accordance with an embodiment of the invention. In some embodiments, the adapter 900 may be similar to and/or have characteristics of the adapter 200 of FIGS. 1-3, the adapter 400 of FIG. 4, the adapter 600 of FIGS. 5-7, and/or the adapter 800 of FIG. 8. Additionally, or alternatively, the adapter 200 of FIGS. 1-3, the adapter 400 of FIG. 4, the adapter 600 of FIGS. 5-7, and/or the adapter 800 of FIG. 8 may be similar to and/or have characteristics of the adapter 900. For example, and as shown in FIG. 9, the adapter 900 may include an adapter body 902 including a central opening 904 for receiving the head 950 of the fastener driving tool. As also shown in FIG. 9, the adapter 900 and/or the adapter body 902 may include an upper tab 906, a first tab 908 (e.g., a left tab when viewed from the perspective of an installer holding the fastener driving tool), and a second tab 910 (e.g., a right tab when view from the perspective of an installer holding the fastener driving tool). As also shown in FIG. 9, the adapter 900 may include an upper pin 912 positioned in the upper tab 906, a first pin 914 positioned in the first tab 908, and a second pin 916 positioned in the second tab 910.

As shown in FIG. 9, each of the pins (e.g., the upper pin 912, the first pin 914, and the second pin 916) is equidistant from a barrel 952 in the head 950 through which a fastener is driven by the fastener driving tool. Furthermore, each of the pins is positioned in the adapter body 902 such that, when a pin engages an upper edge of a siding board, the barrel 952 is positioned at a target distance (e.g., as determined by a manufacturing specification, a building code, and/or the like) from the upper edge of the siding board.

As also shown in FIG. 9, the central opening 904 may be configured to receive the head 950 such that gaps 922 and 924 are formed between the edge of the central opening 904 and the head 950. In some embodiments, the gaps 922 and 924 may be configured to simplify and/or increase efficiency of manufacturing the adapter 900 while still securely receiving and/or attaching to the head 950.

As shown by comparing the head 850 of FIG. 8 and the head 950 of FIG. 9, embodiments of the adapter may include central openings configured to receive differently-shaped heads of fastener driving tools (e.g., from different brands, models, manufacturers, and/or the like). For example, the adapter 800 may include the central opening 804 configured to receive heads shaped similarly to the head 850 (e.g., from a first brand and/or a first model), and the adapter 900 may include the central opening 904 configured to receive heads shaped similarly to the head 950 (e.g., from a first brand and/or a first model).

Additionally, or alternatively, embodiments of the adapter may include pins positioned in the adapter body such that each pin is equidistant from a barrel of a head for different fastener driving tools (e.g., from different brands, models, manufacturers, and/or the like). For example, the adapter 800 may include pins positioned in the adapter body 802 to be equidistant from the barrel 852 of a first brand and/or a first model of a fastener driving tool, and the adapter 900 may include pins positioned in the adapter body 902 to be equidistant from the barrel 952 of a second brand and/or a second model of a fastener driving tool.

FIG. 10 depicts a front elevation view of a manufacturing unit 1000 in accordance with an embodiment of the invention. In some embodiments, the manufacturing unit 1000 may be machined (e.g., computer numerical control (CNC) machining and/or the like) from a sheet of aluminum. For example, multiple manufacturing units 1000 may be machined from the sheet of aluminum by repeating the machining steps used to form the manufacturing unit 1000 over different areas of the sheet of aluminum. In some embodiments, the configuration of the manufacturing unit (e.g., a four-piece orientation and/or the like) may reduce material cost by efficiently using the sheet of aluminum.

As shown in FIG. 10, the manufacturing unit may include four adapters 1002, 1004, 1006, and 1008. In some embodiments, the four adapters 1002, 1004, 1006, and 1008 may be similar to and/or have characteristics of the adapter 200 of FIGS. 1-3, the adapter 400 of FIG. 4, the adapter 600 of FIGS. 5-7, the adapter 800 of FIG. 8, and/or the adapter 900 of FIG. 9. Additionally, or alternatively, the adapter 200 of FIGS. 1-3, the adapter 400 of FIG. 4, the adapter 600 of FIGS. 5-7, the adapter 800 of FIG. 8, and/or the adapter 900 of FIG. 9 may be similar to and/or have characteristics of the four adapters 1002, 1004, 1006, and 1008.

As also shown in FIG. 10, each of the four adapters 1002, 1004, 1006, and 1008 may be connected to two other adapters by links 1010, 1012, 1014, and 1016. For example, link 1010 may connect a second tab of adapter 1002 to a first tab of adapter 1004, and link 1016 may connect an upper tab of adapter 1002 to an upper tab of adapter 1006. As another example, link 1014 may connect a second tab of adapter 1008 to a first tab of adapter 1006, and link 1012 may connect an upper tab of adapter 1008 to an upper tab of adapter 1004. In some embodiments, and as shown in FIG. 10, holes may be machined in the links 1010, 1012, 1014, and 1016 to facilitate separation of the adapters 1002, 1004, 1006, and 1008 from each other. Additionally, or alternatively, after separating adapters 1002, 1004, 1006, and 1008 from each other, portions of the links 1010, 1012, 1014, and 1016 remaining attached to each of the adapters 1002, 1004, 1006, and 1008 may be machined away (e.g., to produce a smooth outer surface for the adapters 1002, 1004, 1006, and 1008 and/or the like).

FIG. 11 depicts a front elevation view of a head 1200 of a fastener driving tool and an adapter 1100 in accordance with an embodiment of the invention. FIG. 12 depicts an exploded, front perspective view of the head 1200 and the adapter 1100 in accordance with an embodiment of the invention. In some embodiments, the adapter 1100 may be similar to and/or have characteristics of the adapter 200 of FIGS. 1-3, the adapter 400 of FIG. 4, the adapter 600 of FIGS. 5-7, the adapter 800 of FIG. 8, and/or the adapter 900 of FIG. 9. Additionally, or alternatively, the adapter 200 of FIGS. 1-3, the adapter 400 of FIG. 4, the adapter 600 of FIGS. 5-7, the adapter 800 of FIG. 8, and/or the adapter 900 of FIG. 9 may be similar to and/or have characteristics of the adapter 1100.

As shown in FIGS. 11 and 12, the adapter 1100 may include an adapter body 1102 including a central opening 1104 for receiving the head 1200 of the fastener driving tool. In some embodiments, and as shown in FIGS. 11 and 12, the adapter 1100 may include a first pair of pins, including a first lower pin 1106 and a first upper pin 1108, and a second pair of pins, including a second lower pin 1110 and a second upper pin 1112, where the first pair of pins and the second pair of pins are on opposite sides of the central opening 1104.

As shown in FIGS. 11 and 12, the head 1200 may include a barrel 1202 through which a fastener is driven by the fastener driving tool. In some embodiments, the first lower pin 1106 and the second lower pin 1110 and are equidistant from a center of the barrel 1202. Additionally, or alternatively, an axis passing through the first upper pin 1108 and the second upper pin 1112 is offset from the center of the barrel 1202 by a distance that corresponds to a distance from the center of the barrel 1202 to each of the centers of the first lower pin 1106 and the second lower pin 1110. In some embodiments, the first upper pin 1108 is a same distance from the first lower pin 1106 as the second upper pin 1112 is from the second lower pin 1110. Additionally, or alternatively, the first upper pin 1108 is a same distance from the second upper pin 1112 as the first lower pin 1106 is from the second lower pin 1110. For example, and as shown in FIG. 11, the four pins (i.e., the first lower pin 1106, the first upper pin 1108, the second lower pin 1110, and the second upper pin 1112) may form a rectangle having a length that is twice as long as a height of the rectangle. Additionally, or alternatively, the center of the barrel 1202 may be positioned along a lower length of the rectangle at a position corresponding to half the length of the rectangle.

As shown by the dashed lines in FIG. 12, the adapter 1100 may be positioned on the head 1200 of the fastener driving tool by inserting the head 1200 into the central opening 1104 of the adapter body 1102. In some embodiments, the central opening 1104 may be configured to be friction fit onto the head 1200. Additionally, or alternatively, the head 1200 may be positioned within the central opening 1104 and attached to the adapter body 1102 using another attachment mechanism, such as welding, set screws, epoxy, and/or the like as described herein (e.g., with respect to FIGS. 3, 4, 13, and/or 14).

In some embodiments, an installer may use the fastener driving tool and the adapter 1100 in a manner similar to that described herein with respect to FIGS. 5-7, and, when the installer slides the head 1200 of the fastener driving tool towards an upper edge of a siding board, the first upper pin 1108 and the second upper pin 1112 may project downward from the adapter 1100 and/or the adapter body 1102 and engage the upper edge of the siding board. When the first upper pin 1108 and the second upper pin 1112 engage the upper edge of the siding board, the installer may operate the fastener driving tool to drive a fastener through the siding board into a structure, thereby securing the siding board to the structure. By driving the fastener through the siding board when the first upper pin 1108 and the second upper pin 1112 are engaged with the upper edge, the fastener may be positioned at a target distance (e.g., as determined by a manufacturing specification, a building code, and/or the like) from the upper edge of the siding board.

In some embodiments, the installer may rotate the fastener driving tool ninety degrees counterclockwise from the orientation shown in FIGS. 5-7. In such embodiments, rather than the first upper pin 1108 and the second upper pin 1112 projecting downward, the first lower pin 1106 and the first upper pin 1108 may project downward from the adapter 1100 and/or the adapter body 1102 and engage the upper edge of the siding board as the installer slides the head 1200 and the adapter 1100 towards the upper edge. Similarly, the installer may rotate the fastener driving tool ninety degrees clockwise from the orientation shown in FIGS. 5-7, and the second lower pin 1110 and the second upper pin 1112 may project downward from the adapter 1100 and/or the adapter body 1102 and engage the upper edge of the siding board as the installer slides the head 1200 and the adapter 1100 towards the upper edge. Thus, the adapter may position the head 1200 to drive a fastener into the siding board at the target distance from the upper edge when the fastener driving tool is in an upright position, rotated ninety degrees clockwise, or rotated ninety degrees counterclockwise.

FIG. 13 depicts a front elevation view of a head 1400 of a fastener driving tool and an adapter 1300 in accordance with an embodiment of the invention. FIG. 14 depicts an exploded, front perspective view of the head 1400 and the adapter 1300 in accordance with an embodiment of the invention. In some embodiments, the adapter 1300 may be similar to and/or have characteristics of the adapter 200 of FIGS. 1-3, the adapter 400 of FIG. 4, the adapter 600 of FIGS. 5-7, the adapter 800 of FIG. 8, the adapter 900 of FIG. 9, and/or the adapter 1100 of FIG. 11. Additionally, or alternatively, the adapter 200 of FIGS. 1-3, the adapter 400 of FIG. 4, the adapter 600 of FIGS. 5-7, the adapter 800 of FIG. 8, the adapter 900 of FIG. 9, and/or the adapter 1100 of FIG. 11 may be similar to and/or have characteristics of the adapter 1300.

For example, the adapter 1300 may include an adapter body 1302, a central opening 1304, an upper tab 1306, a first tab 1308, a second tab 1310, an upper pin 1312, a first pin 1314, and a second pin 1316 similar to corresponding elements of the adapter 800 of FIG. 8. As shown in FIGS. 13 and 14, the adapter 1300 may include attachment mechanisms, namely a first set screw 1318 and a second set screw 1320, for securing the adapter 1300 to the head 1400. As also shown in FIGS. 13 and 14, the adapter 1300 and/or the adapter body 1302 may include receiving holes, namely a first receiving hole 1322 and a second receiving hole 1324, for receiving the attachment mechanisms. In some embodiments, each of the first set screw 1318 and the second set screw 1320 may include threaded exterior surfaces, and each of the first receiving hole 1322 and the second receiving hole 1324 may include correspondingly threaded interior surfaces such that rotating the first set screw 1318 and the second set screw 1320 advances the first set screw 1318 and the second set screw 1320 into and through the first receiving hole 1322 and the second receiving hole 1324, respectively. As shown in FIG. 13 with respect to the first set screw 1318, each of the first set screw 1318 and the second set screw 1320 may be advanced into the central opening 1304 into contact with the head 1400.

As shown by the dashed lines in FIG. 14, the adapter 1300 may be positioned on the head 1400 of the fastener driving tool by inserting the head 1400 into the central opening 1304 of the adapter body 1302. In some embodiments, the central opening 1304 may be configured to be friction fit onto the head 1400. Additionally, or alternatively, and as shown in FIG. 14, the first set screw 1318 and the second set screw 1320 may be inserted into the respective receiving holes 1322 and 1324 and tightened to securely hold the adapter 1300 on the head 1400. In some embodiments, other attachment mechanisms (e.g., other than set screws) and/or combinations of attachment mechanisms may be used to secure the adapter 1300 to the head 1400.

Additionally, or alternatively, the adapter 1300 may include converter elements that permit the adapter 1300 to be secured to multiple differently shaped heads of fastener driving tools (e.g., from different brands, models, manufacturers, and/or the like). For example, the adapter 1300 may include a first converter element for placing in the central opening 1304 when securing the adapter to a head having a first shape (e.g., of a first brand and/or a first model), and the adapter 1300 may include a second converter element for placing in the central opening 1304 when securing the adapter to a head having a second shape (e.g., of a second brand and/or a second model). In this way, the adapter 1300 may be converted using the converter elements for use with two, three, four, five, or more differently shaped heads of fastener driving tools.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An adapter for a fastener driving tool, the adapter comprising:
- an adapter body having a central opening for receiving a head of a fastener driving tool, wherein the adapter body comprises an upper tab, a first tab, and a second tab; and
- only three pins, wherein the three pins comprise:
  - an upper pin positioned in the upper tab, wherein the central opening and the upper pin define a vertical axis with respect to the adapter body;
  - a first pin positioned in the first tab on a first side of the vertical axis; and
  - a second pin positioned in the second tab on a second side of the vertical axis opposite the first side;
  - wherein the upper pin, the first pin, and the second pin are positioned in the adapter body such that, when the central opening receives the head, the upper pin, the first pin, and the second pin are equidistant from a center of a barrel through which the fastener driving tool drives fasteners.

2. The adapter of claim 1, wherein the adapter body comprises machined aluminum.

3. The adapter of claim 1, wherein each of the upper pin, the first pin, and the second pin comprises:
- a ferrule;
- a stud extending through the ferrule; and
- a biasing mechanism configured to bias the stud within the ferrule such that a portion of the stud extends out of an end of the ferrule.

4. The adapter of claim 1, wherein the adapter body comprises holes, wherein each hole, of the holes, is configured to receive a pin of the upper pin, the first pin, and the second pin.

5. The adapter of claim 4, wherein each hole, of the holes, is configured to position an interior edge of a pin of the upper pin, the first pin, and the second pin a target distance from the center of the barrel through which the fastener driving tool drives fasteners.

6. The adapter of claim 1, wherein the central opening is configured for receiving differently shaped heads of fastener driving tools.

7. The adapter of claim 1, comprising one or more set screws, wherein the adapter body comprises one or more receiving holes for receiving the one or more set screws, and wherein the one or more set screws are configured to be advanced through the one or more receiving holes into contact with the head of the fastener driving tool.

8. The adapter of claim 1, wherein the central opening, the first pin, and the second pin define a horizontal axis with respect to the adapter body.

9. A fastener driving tool, comprising:
- a barrel through which the fastener driving tool drives fasteners;
- a head, at an end of the barrel, through which the fastener driving tool drives fasteners; and
- an adapter positioned on the head, wherein the adapter comprises:
  - an adapter body having a central opening for receiving the head, wherein the adapter body comprises an upper tab, a first tab, and a second tab; and
  - only three pins, wherein the three pins comprise:
    - an upper pin positioned in the upper tab, wherein the central opening and the upper pin define a vertical axis with respect to the adapter body;
    - a first pin positioned in the first tab on a first side of the vertical axis; and
    - a second pin positioned in the second tab on a second side of the vertical axis opposite the first side;
    - wherein the upper pin, the first pin, and the second pin are positioned in the adapter body such that the upper pin, the first pin, and the second pin are equidistant from a center of the barrel.

10. The fastener driving tool of claim 9, wherein the central opening of the adapter body is configured to friction fit onto the head of the fastener driving tool.

11. The fastener driving tool of claim 9, comprising an attachment mechanism attaching the adapter body to the head of the fastener driving tool.

12. The fastener driving tool of claim 9, wherein adapter body has a thickness configured such that the adapter does not interfere with operation of the fastener driving tool.

13. The fastener driving tool of claim 9, wherein the head is integrated with a safety mechanism configured to permit the fastener driving tool to drive a fastener only when the head and the adapter are pressed against a surface.

14. The fastener driving tool of claim 9, wherein the central opening, the first pin, and the second pin define a horizontal axis with respect to the adapter body.

15. A roofing gun, comprising:
- a barrel through which the roofing gun drives roofing nails;
- a head, at an end of the barrel, through which the roofing gun drives roofing nails; and
  - an adapter positioned on the head, wherein the adapter comprises:
- an adapter body having a central opening for receiving the head, wherein the adapter body comprises an upper tab, a first tab, and a second tab; and
  - only three pins, wherein the three pins comprise:
    - an upper pin positioned in the upper tab, wherein the central opening and the upper pin define a vertical axis with respect to the adapter body;
  - a first pin positioned in the first tab on a first side of the vertical axis; and
    - a second pin positioned in the second tab on a second side of the vertical axis opposite the first side;
    - wherein the upper pin, the first pin, and the second pin are positioned in the adapter body such that the upper pin, the first pin, and the second pin are equidistant from a center of the barrel.

16. The roofing gun of claim 15, wherein:
- the central opening of the adapter body is configured to friction fit onto the head; and
- the adapter body is attached to the head via one or more welds.

17. The roofing gun of claim 15, wherein each of the upper pin, the first pin, and the second pin comprises a spring-loaded plunger configured to be biased such that each of the upper pin, the first pin, and the second pin projects outward from the adapter body parallel to a direction in which the roofing gun drives roofing nails.

18. The roofing gun of claim 17, comprising a safety mechanism configured to permit the roofing gun to drive a roofing nail only when the head and the adapter are pressed against a surface.

19. The roofing gun of claim 15, wherein the adapter body comprises holes, wherein each hole, of the holes, is configured to receive a pin of the upper pin, the first pin, and the second pin, and wherein each hole, of the holes, is configured to position an interior edge of a pin of the upper pin, the first pin, and the second pin a target distance from the center of the barrel through which the roofing gun drives roofing nails.

20. The roofing gun of claim 15, wherein the central opening, the first pin, and the second pin define a horizontal axis with respect to the adapter body.

* * * * *